United States Patent
Do

(10) Patent No.: US 9,706,359 B2
(45) Date of Patent: Jul. 11, 2017

(54) RANGING AND/OR LOCALIZATION SERVICE BASED ON MOBILE DEVICE PRIVILEGE

(71) Applicant: QUALCOMM Incorporated, San Diego, CA (US)

(72) Inventor: Ju-Yong Do, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/863,246

(22) Filed: Sep. 23, 2015

(65) Prior Publication Data

US 2017/0086024 A1    Mar. 23, 2017

(51) Int. Cl.
| | |
|---|---|
| *H04W 4/02* | (2009.01) |
| *H04L 12/26* | (2006.01) |
| *H04L 27/26* | (2006.01) |
| *H04W 74/00* | (2009.01) |
| *H04L 12/851* | (2013.01) |
| *G01S 13/82* | (2006.01) |
| *G01S 5/14* | (2006.01) |
| *G01S 13/76* | (2006.01) |

(52) U.S. Cl.
CPC ........... *H04W 4/023* (2013.01); *G01S 13/825* (2013.01); *H04L 27/266* (2013.01); *H04L 43/0864* (2013.01); *H04L 47/24* (2013.01); *H04W 74/002* (2013.01); *G01S 5/14* (2013.01); *G01S 13/765* (2013.01)

(58) Field of Classification Search
CPC ......... E21C 35/24; E21C 35/08; H04B 13/02; H04B 7/15557; H04B 7/15528; H04B 7/15514; G06F 3/0338; G06F 3/011; G06T 13/80; G06T 19/006; E21F 11/00
See application file for complete search history.

(56) References Cited

U.S. PATENT DOCUMENTS

| | | | |
|---|---|---|---|
| 8,933,776 B2 | 1/2015 | Dua et al. | |
| 2012/0021760 A1 | 1/2012 | Strohbach et al. | |
| 2013/0250931 A1* | 9/2013 | Abraham | H04W 8/005 |
| | | | 370/338 |
| 2014/0187259 A1 | 7/2014 | Kakani et al. | |
| 2014/0256346 A1 | 9/2014 | Venkatraman et al. | |
| 2014/0323150 A1 | 10/2014 | Mangold et al. | |
| 2014/0342662 A1 | 11/2014 | Das et al. | |
| 2015/0087328 A1 | 3/2015 | Chao et al. | |

FOREIGN PATENT DOCUMENTS

| | | |
|---|---|---|
| WO | WO-2013098656 A2 | 7/2013 |
| WO | WO-2014137868 A1 | 9/2014 |
| WO | WO-2015009498 A1 | 1/2015 |

OTHER PUBLICATIONS

Co-pending U.S. Appl. No. 14/732,403, filed Jun. 5, 2015.
International Search Report and Written Opinion—PCT/US2016/050599—ISA/EPO—Nov. 22, 2016.

* cited by examiner

*Primary Examiner* — Chuong A Ngo
(74) *Attorney, Agent, or Firm* — Berkeley Law & Technology Group, LLP

(57) ABSTRACT

Example methods, apparatuses, or articles of manufacture are disclosed herein that may be utilized, in whole or in part, to facilitate or support one or more operations or techniques for a ranging and/or localization service based, at least in part, on mobile communication device privilege, for example.

40 Claims, 6 Drawing Sheets

RANGING AND/OR LOCALIZATION SERVICE BASED ON MOBILE DEVICE PRIVILEGE

BACKGROUND

1. Field

The present disclosure relates generally to position or location estimations of mobile communication devices and, more particularly, to a ranging and/or localization service based, at least in part, on mobile communication device privilege.

2. Information

Mobile communication devices, such as, for example, cellular telephones, portable navigation units, laptop computers, personal digital assistants, or the like are becoming more common every day. Certain mobile communication devices, such as, for example, location-aware cellular telephones, smart telephones, or the like may assist users in estimating their geographic locations by providing positioning assistance parameters obtained or gathered from various systems. For example, in an outdoor environment, certain mobile communication devices may obtain an estimate of their geographic location or so-called "position fix" by acquiring wireless signals from a satellite positioning system (SPS), such as the global positioning system (GPS) or other like Global Navigation Satellite Systems (GNSS), cellular base station, etc. via a cellular telephone or other wireless or electronic communications network. Acquired wireless signals may, for example, be processed by or at a mobile communication device, and its location may be estimated using known techniques, such as Advanced Forward Link Trilateration (AFLT), base station identification, cell tower triangulation, or the like.

In an indoor environment, mobile communication devices may be unable to reliably receive or acquire satellite or like wireless signals to facilitate or support one or more position estimation techniques. For example, signals from an SPS or other wireless transmitters may be attenuated or otherwise affected in some manner (e.g., insufficient, weak, fragmentary, etc.), which may at least partially preclude their use for position estimations. At times, a mobile communication device may obtain a position fix by measuring ranges to three or more terrestrial wireless access points positioned at known locations. Ranges may be measured, for example, by obtaining a Media Access Control identifier (MAC ID) address from wireless signals received from suitable access points and measuring one or more characteristics of received signals, such as signal strength, round trip delay, or the like. In some instances, however, such as if round trip delay time measurements are utilized, for example, a process of measuring ranges may significantly tax available resources, such as bandwidth in wireless communication links, memory space, battery life, etc. of mobile communication devices, etc., may increase data usage, associated costs or data charges, or the like.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
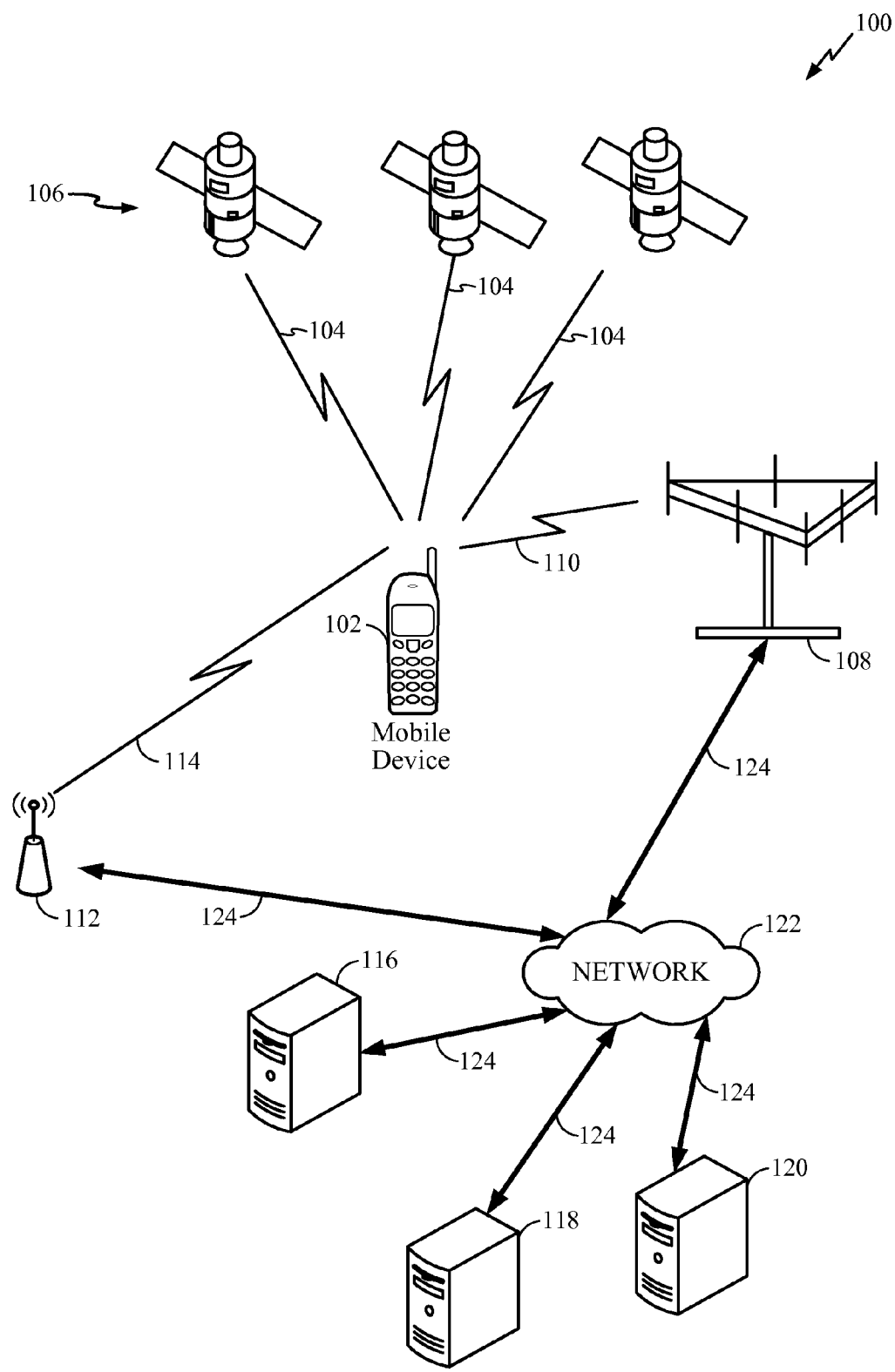
FIG. 1 is a schematic diagram illustrating features associated with an implementation of an example operating environment.

Example implementations relate to techniques for a ranging and/or localization service based, at least in part, on mobile communication device privilege. In one implementation, a method may comprise receiving one or more messages from a mobile device to obtain measurements in support of the ranging service, the one or more messages comprising one or more parameters corresponding to one or more characteristics of the mobile device; and determining a level of privilege of the mobile device based, at least in part, on the one or more parameters in the one or more messages received from the mobile device In another implementation, an apparatus may comprise means for receiving one or more messages from a mobile device to obtain measurements in support of the ranging service, the one or more messages comprising one or more parameters corresponding to one or more characteristics of the mobile device; and means for determining a level of privilege of the mobile device based, at least in part, on the one or more parameters in the one or more messages received from the mobile device.

In yet another implementation, an apparatus may comprise a wireless transceiver to communicate with an electronic communications network to receive one or more messages from a mobile device to obtain measurements in support of the ranging service, the one or more messages comprising one or more parameters corresponding to one or more characteristics of the mobile device; and one or more processors coupled to a memory, the one or more processors and the memory configured to determine a level of privilege of the mobile device based, at least in part, on the one or more parameters in the one or more messages received from the mobile device.

In yet another implementation, an article may comprise a non-transitory storage medium having instructions executable by a processor to receive one or more messages from a mobile device to obtain measurements in support of the ranging service, the one or more messages comprising one or more parameters corresponding to one or more characteristics of the mobile device; and determine a level of privilege of the mobile device based, at least in part, on the one or more parameters in the one or more messages received from the mobile device.

In yet another implementation, a method may comprise transmitting, at a mobile device, one or more messages to obtain measurements in support of the ranging service, the one or more messages comprising one or more parameters corresponding to one or more characteristics of the mobile device; and receiving a message indicating a determined level of privilege for the mobile device based, at least in part, on the one or more transmitted parameters corresponding to the one or more characteristics of the mobile device.

In yet another implementation, an apparatus may comprise a wireless transceiver to communicate with an electronic communications network to transmit one or more messages to obtain measurements in support of a ranging service, the one or more messages comprising one or more parameters corresponding to one or more characteristics of a mobile device; and one or more processors coupled to a memory, the one or more processors and the memory configured to receive a message indicating a determined level of privilege for the mobile device based, at least in part, on the one or more transmitted parameters corresponding to the one or more characteristics of the mobile device. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations and/or techniques for a ranging and/or localization service based, at least in part, on mobile communication device privilege. As used herein, "mobile communication device," "mobile device," "location-aware mobile device," or like terms may be used interchangeably and may refer to any kind of special purpose computing platform or apparatus that may from time to time have a position or location that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be called simply mobile devices, may include, for example, cellular telephones, smart telephones, personal digital assistants (PDAs), laptop computers, personal entertainment systems, tablet personal computers (PC), personal audio or video devices, personal navigation devices, radio heat map generation tools, or the like. It should be appreciated, however, that these are merely examples of mobile devices that may be used, at least in part, to implement one or more operations and/or techniques for a ranging and/or localization service based, at least in part, on mobile device privilege, and that claimed subject matter is not limited in this regard. It should also be noted that the terms "position" and "location" may be used interchangeably herein.

As alluded to previously, in an indoor environment or like partially or substantially enclosed areas (e.g., urban canyons, etc.), certain mobile devices may be unable to reliably receive or acquire satellite or like wireless signals to facilitate or support one or more position estimation techniques. As such, different techniques may be employed to enable indoor navigation or location services. For example, an indoor position fix of a mobile device, such as a cellular telephone, may be obtained based, at least in part, on information gathered from various systems. One such system may comprise, for example, a wireless local access network (WLAN) communication system having a number of wireless transmitters, such as access points that operate in accordance with the Institute of Electrical and Electronics Engineers (IEEE) standard 802.11 (IEEE 802.11 std. Wi-Fi access points) supporting communications for a number of proximate mobile devices. Here, to obtain a position fix, a mobile device may, for example, measure ranges to three or more terrestrial Wi-Fi access points positioned at known locations, such as via one or more appropriate computations. Ranges may be measured, for example, by obtaining a Media Access Control (MAC) address from known Wi-Fi access points and measuring one or more signal characteristics indicative of received signal strength (e.g., received signal strength indicator (RSSI), etc.), round trip delay times (e.g., RTT, etc.), or the like, such as obtained via a suitable message exchange. Based, at least in part, on computed ranges, a mobile device may, for example, estimate its location by applying one or more suitable positioning techniques, such as trilateration, triangulation, etc., just to illustrate a few possible implementations.

Over time, recorded RSSI values within an indoor or like environment may vary, however, even if there are no or little changes to an associated propagation space. Since RSSI values may be prone to environmental interference, such as multipath fading or shadowing effects, for example, at times, path loss-based ranging may be less accurate or useful. In addition, parameters employed in these models are typically site-specific and/or nonlinear. As compared to RSSI-based ranging, thus, in some instances, ranging based on RTT measurements may prove beneficial since its measurement results may scale linearly with open-air propagation distances. In this context, "ranging and/or localization service," "ranging based on RTT measurements," "ranging service," or like terms may be used interchangeably and refer to a technique, such as implemented in connection with a particular service (e.g., a location-based service (LBS), etc.), for example, of measuring or estimating a distance or range from a transmitter to a reference point via a measurement of travel time of one or more signals traveling from the transmitter to the reference point and back. For example, ranging based on RTT measurements may include any types or variations of such a technique, such as ranging based on RTT measurements with multipath correction, ranging based on RTT measurements with received signal strength indicator (RSSI), backscatter modulation, ranging based on RTT measurements utilizing radio signals, acoustic signals, infrared signals, or the like. Thus, even though references to ranging based on RTT measurements using radio signals are made throughout the present specification, such as for ease of discussion, any suitable signal(s) capable of facilitating or supporting one or more measurements of an appropriate or applicable round trip time may be employed herein, in whole or in part.

Thus, at times, a mobile device may, for example, compute or obtain (e.g., via a server, etc.) a range to a wireless transmitter, such as a Wi-Fi access point based, at least in part, on an RTT measurement of a suitable message exchange between the mobile device and the wireless transmitter. As will be seen, in some instances, a message exchange may comprise, for example, a fine timing measurement (FTM) and fine timing measurement request (FTMR) message exchange (an FTM/FTMR message exchange), such as implemented in connection with the IEEE 802.11v std., IEEE 802.11 mc std., etc., just to illustrate a few possible implementations. For example, a mobile device and a wireless transmitter may implement a number of FTM frame exchanges and responses to the FTM frames/acknowledgements (ACKs) and may record and/or share respective measurements of transmission and arrival times. Based, at least in part, on recorded measurements of transmission and arrival times, an RTT measurement may be estimated, for example, and an applicable range may be computed or obtained, such as using one or more appropriate techniques (e.g., triangulation, etc.). Particular examples of FTM/FTMR frame exchanges will be described in greater detail below with reference to FIG. 3.

Likewise, in some instances, a range between a mobile device and an applicable wireless transmitter may, for example, be computed or obtained, at least in part, via a request-to-send/clear-to-send (RTS/CTS) message exchange. For example, a mobile device may compute or obtain a range by measuring a signal RTT to an access point by transmitting one or more IEEE 802.11 std. probe requests (e.g., via an RTS data frame, etc.) and measuring a time until receipt of a response message (e.g., via a CTS data frame, etc.). A probe request may, for example, be transmitted periodically by a mobile device to announce its presence in an area, relay applicable or appropriate information, such as a MAC address, signal-related identifiers having a timestamp with a time at which the beacon was sent, or other mobile device-related information. RTS/CTS message exchanges are generally known and need not be described here in greater detail. Again, it should be noted that claimed subject matter is not limited to a particular standard, ranging protocol, type of wireless signals, etc., such as for purposes of estimating an RTT measurement, for example, and/or computing or obtaining a range between a mobile device and an applicable wireless transmitter. Thus, any other suitable techniques or approaches may be utilized herein, in whole or in part, such as without deviating from the scope and/or spirit of claimed subject matter.

While in some instances an exchange of FTM/FTMR messages may yield a more accurate range than an exchange of RTS/CTS frames, such as for computing an indoor position fix, for example, at times, FTM/FTMR frames may consume more network or other resources. For example, in denser operating environments, such as where there are multiple mobile devices receiving service from the same access points, FTM/FTMR message exchanges may consume more uplink and/or downlink resources that may be otherwise employed by or for other services (e.g., Internet Protocol (IP) services, etc.), mobile devices, etc. In addition, to facilitate or support RTT measurements, more network resources (e.g., particular access points, etc.) and time, such as to perform a requisite number of FTM/FTMR message exchanges, for example, may need to be specifically allocated. This may be operationally expensive, may result in positioning latencies in denser operating environments, or the like. Thus, at times, it may be useful for a particular communications network, wireless service provider, venue operator, employer, etc. to limit access in some manner to a higher-accuracy and/or more operationally expensive RTT measurements, such as for purposes of network load balancing, allocating channel priority, coordinating associated wireless traffic, or the like. Accordingly, it may be desirable to develop one or more methods, systems, and/or apparatuses that may implement more efficient and/or more effective indoor or like localization, such as via a tiered ranging and/or localization service, for example, that, at times, may be based, at least in part, on mobile device privilege.

Thus, as will be discussed in greater detail below, in an implementation, a certain level of privilege may, for example, be assigned to or associated with a particular mobile device (and a co-located user). In some instances, a level of privilege may represent or correspond to, for example, a quality of a ranging and/or localization service to be provided by a server and/or associated wireless communications network and/or to be received by a mobile device, such as within an indoor or like area of interest. As will be seen, in some instances, an assigned or associated level of privilege may be determined, at least in part, in connection with one or more mobile device-server communications. Based, at least in part, a determined level of privilege, an applicable quality of a ranging and/or localization service may, for example, be provided. For example, at times, a mobile device with a higher level of privilege may be granted access to a ranging and/or localization service based on RTT measurements utilizing an exchange of relatively more accurate but operationally more expensive FTM/FTMR messages. Also, in some instances, a mobile device with a lower-tiered level of privilege may be denied access to a ranging and/or localization service based on RTT measurements utilizing an exchange FTM/FTMR messages, for example, but may be granted access to a ranging and/or localization service based on RTT measurements utilizing an exchange of relatively less accurate but also less expensive RTS/CTS messages. Any suitable combination of these or like approaches may also be employed or otherwise considered (e.g., within a certain time period, a mobile device may be allowed one RTT measurement via an exchange of FTM/FTMR messages, for example, and five RTT measurements via an exchange of RTS/CTS messages, etc.). In addition, as discussed below, at times, based, at least in part, on determined privilege, RTT frequency or periodicity of a particular message exchange may, for example, may be limited or adjusted in a suitable manner. Also, in some instances, such as for a mobile device with a lower-tiered ranging service, for example, a random error, such as to lower or degrade to some extent RTT ranging accuracy of a particular message exchange may be injected or introduced, as will also be seen.

FIG. 1 is a schematic diagram illustrating features associated with an implementation of an example operating environment 100 capable of facilitating or supporting one or more processes or operations for a ranging and/or localization service that may be based, at least in part, on a level of privilege of a mobile device, such as a location-aware mobile device 102, for example. It should be appreciated that operating environment 100 is described herein as a non-limiting example that may be implemented, in whole or in part, in the context of various electronic communications networks or combination of such networks, such as public networks (e.g., the Internet, the World Wide Web), private networks (e.g., intranets), wireless local area networks (WLAN, etc.), or the like. It should also be noted that claimed subject matter is not limited to indoor implementations. For example, at times, one or more operations or techniques described herein may be performed, at least in part, in an indoor-like environment, which may include partially or substantially enclosed areas, such as urban canyons, town squares, amphitheaters, parking garages, rooftop gardens, patios, or the like. At times, one or more operations or techniques described herein may be performed, at least in part, in an outdoor environment.

As illustrated, in an implementation, mobile device 102 may, for example, receive or acquire satellite positioning system (SPS) signals 104 from SPS satellites 106. In some instances, SPS satellites 106 may be from a single global navigation satellite system (GNSS), such as the GPS or Galileo satellite systems, for example. In other instances, SPS satellites 106 may be from multiple GNSS such as, but not limited to, GPS, Galileo, Glonass, or Beidou (Compass) satellite systems. In certain implementations, SPS satellites 106 may be from any one several regional navigation satellite systems (RNSS) such as, for example, WAAS, EGNOS, QZSS, just to name a few examples.

At times, mobile device 102 may, for example, transmit wireless signals to, or receive wireless signals from, a suitable wireless communication network. In one example, mobile device 102 may communicate with a cellular communication network, such as by transmitting wireless signals to, or receiving wireless signals from, a base station transceiver 108 over a wireless communication link 110, for example. Similarly, mobile device 102 may transmit wireless signals to, or receive wireless signals from a local transceiver 112 over a wireless communication link 114. Base station transceiver 108, local transceiver 112, etc. may be of the same or similar type, for example, or may represent different types of devices, such as access points, radio beacons, cellular base stations, femtocells, or the like, depending on an implementation. In some instances local transceiver 112 may comprise, for example, a wireless transmitter and/or receiver capable of transmitting and/or receiving wireless signals.

In a particular implementation, local transceiver 112 may be capable of communicating with mobile device 102 at a shorter range over wireless communication link 114 than at a range established via base station transceiver 108 over wireless communication link 110. For example, local transceiver 112 may be positioned in an indoor or like environment and may provide access to a wireless local area network (WLAN, e.g., IEEE Std. 802.11 network, etc.) or wireless personal area network (WPAN, e.g., Bluetooth® network, etc.). As was indicated, at times, an indoor or like environment associated with local transceiver 112 may comprise, for example, a denser environment where multiple mobile devices receive service from local transceiver 112, such as in connection with FTM/FTMR message exchanges, for example, which may consume uplink and/or downlink resources, create or contribute to wireless traffic congestion, tax available bandwidth, or the like. In an implementation, local transceiver 112 may comprise a femtocell capable of facilitating communication via link 114 according to an applicable cellular or like wireless communication protocol. Of course, it should be understood that these are merely examples of devices that may communicate with mobile device 102 over a wireless link, and claimed subject matter is not limited in this respect. For example, in some instances, operating environment 100 may include a larger number of base station transceivers 108, local transceivers 112, etc., local transceiver 112 may be capable of implementing an RTS/CTS message exchange, such as instead of or in addition to other types of message exchanges (e.g. FTM/FTMR, etc.), or the like.

In an implementation, base station transceiver 108, local transceiver 112, etc. may communicate with servers 116, 118, or 120 over a network 122 via one or more links 124. Network 122 may comprise, for example, any combination of wired or wireless communication links. In a particular implementation, network 122 may comprise, for example, Internet Protocol (IP)-type infrastructure capable of facilitating or supporting communication between mobile device 102 and one or more servers 116, 118, 120, etc. via local transceiver 112, base station transceiver 108, etc. In another implementation, network 122 may comprise, for example cellular communication network infrastructure, such as a base station controller or master switching center to facilitate or support mobile cellular communication with mobile device 102. As discussed below, in some instances, network 122 may facilitate or support one or more message exchanges, such as an FTM/FTMR message exchange, RTS/CTS message exchange, etc., obtaining applicable measurements, or the like.

Servers 116, 118, and/or 120 may comprise any suitable servers or combination thereof capable of facilitating or supporting one or more operations or techniques discussed herein. For example, servers 116, 118, and/or 120 may comprise one or more positioning assistance servers, navigation servers, map servers, crowdsourcing servers, network-related servers, or the like. Servers 116, 118, and/or 120 may facilitate one or more operations or processes discussed herein, such as, for example, setting and/or providing a level of privilege for mobile device 102 (and a co-located user), implementing a particular quality of a ranging and/or localization service to be received by mobile device 102, providing positioning assistance data, or the like.

In particular implementations, and as also discussed below, mobile device 102 may have circuitry or processing resources capable of computing a position fix or estimated location of mobile device 102, initial or otherwise. For example, mobile device 102 may compute a position fix based, at least in part, on pseudorange measurements to four or more SPS satellites 106. Here, mobile device 102 may compute such pseudorange measurements based, at least in part, on pseudonoise code phase detections in signals 104 acquired from four or more SPS satellites 106. In particular implementations, mobile device 102 may receive from one or more servers 116, 118, or 120 positioning assistance data to aid in the acquisition of signals 104 transmitted by SPS satellites 106 including, for example, almanac, ephemeris data, Doppler search windows, just to name a few examples.

In some implementations, mobile device 102 may obtain a position fix by processing wireless signals received from one or more terrestrial transmitters positioned at known locations (e.g., base station transceiver 108, local transceiver 112, etc.) using any one of several techniques, such as, for example, AFLT, observed time difference of arrival (OT-DOA), or the like. In these techniques, a range from mobile device 102 may, for example, be measured to three or more of terrestrial transmitters based, at least in part, on one or more reference signals transmitted by these transmitters and received at mobile device 102, as was indicated. In some instances, mobile device 102 may be capable of computing a position fix based, at least in part, on requisite ranges obtained from RTT measurements of FTM/FTMR, RTS/CTS, or like message exchanges, as was also indicated. At times, servers 116, 118, or 120 may include, for example, a base station almanac (BSA) indicating locations, identities, orientations, etc. of cellular base stations (e.g., base station transceiver 108, local transceiver 112, etc.) in one or more particular areas or regions associated with operating environment 100.

As was indicated, in an implementation, mobile device 102 may, for example, receive positioning assistance data for one or more positioning operations from servers 116, 118, and/or 120. At times, positioning assistance data may include, for example, locations, identities, orientations, etc. of one or more local transceivers 112, base station transceivers 108, etc. positioned at known locations for measuring ranges to these transmitters based, at least in part, on an RTT or other measurements. In some instances, positioning assistance data to aid positioning operations may include, for example, radio heat maps, context parameter maps, routeability graphs, etc., just to name a few examples. Other assistance data received by mobile device 102 may include, for example, electronic digital maps of indoor or like areas for display or to aid in navigation. A map may be provided to mobile device 102 as it enters a particular area, for example, and may show applicable features such as doors, hallways, entry ways, walls, etc., points of interest, such as bathrooms, pay phones, room names, stores, or the like. By obtaining a digital map of an indoor or like area of interest, mobile device 102 may, for example, be capable of overlaying its current location over the displayed map of the area so as to provide an associated user with additional context, frame of reference, or the like. The terms "positioning assistance data" and "navigation assistance data" may be used interchangeably herein.

According to an implementation, mobile device 102 may access indoor navigation assistance data via servers 116, 118, and/or 120 by, for example, requesting such data through selection of a universal resource locator (URL). In particular implementations, servers 116, 118, and/or 120 may be capable of providing indoor navigation assistance data to cover many different indoor areas including, for example, floors of buildings, wings of hospitals, terminals at an airport, portions of a university campus, areas of a large shopping mall, just to name a few examples. Also, if memory or data transmission resources at mobile device 102 make receipt of indoor positioning assistance data for all areas served by servers 116, 118, and/or 120 impractical or infeasible, a request for such data from mobile device 102 may, for example, indicate a rough or course estimate of a location of mobile device 102. Mobile device 102 may then be provided indoor navigation assistance data covering, for example, one or more areas including or proximate to a roughly estimated location of mobile device 102.

Even though a certain number of computing platforms or devices are illustrated herein, any number of suitable computing platforms or devices may be implemented to facilitate or support one or more techniques or processes associated with operating environment 100. For example, at times, network 122 may be coupled to one or more wired or wireless communication networks (e.g., WLAN, etc.) so as to enhance a coverage area for communications with mobile device 102, one or more base station transceivers 108, local transceiver 112, servers 116, 118, 120, or the like. In some instances, network 122 may facilitate or support femtocell-based operative regions of coverage, for example. Again, these are merely example implementations, and claimed subject matter is not limited in this regard.

Figure 2A:
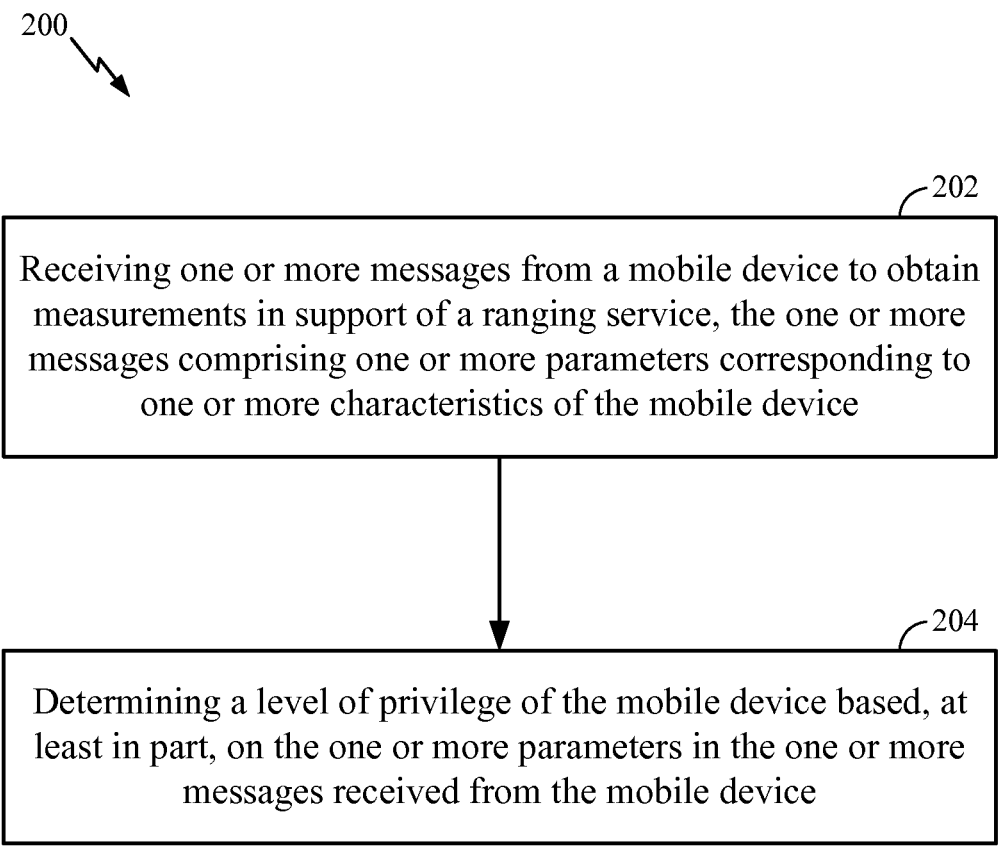
FIG. 2A is a flow diagram illustrating an implementation of an example process that may be performed to facilitate or support a ranging and/or localization service based, at least in part, on mobile device privilege.

With this in mind, attention is now drawn to FIG. 2A, which is a flow diagram illustrating an implementation of an example process 200 that may be performed, in whole or in part, to facilitate or support one or more operations and/or techniques for a ranging and/or localization service based, at least in part, on privilege of a particular mobile device, such as location-aware mobile device 102 of FIG. 1, for example. It should be noted that information acquired or produced, such as, for example, input signals, output signals, operations, results, etc. associated with example process 200 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process 200 may, for example, begin at operation 202 with receiving one or more messages from a mobile device to obtain measurements in support of a ranging service. As was indicated, in at least one implementation, a ranging and/or localization service may comprise, for example, a ranging and/or localization service based on round trip time measurements of suitable signals (e.g., radio, acoustic, infrared, etc.) that may be used, at least in part, for computing or estimating a range between a mobile device and an applicable wireless transmitter. At times, one or more received messages may include, for example, one or more parameters that may be used, at least in part, such as by a suitable server, as one possible example, to determine a level of privilege of a mobile device, as discussed below. Depending on an implementation, one or more parameters may comprise, for example, a MAC address, model, operating system, ranging capability, etc. of a communicating mobile device, just to illustrate a few examples. At times, one or more parameters may comprise, for example, a parameter associating a particular mobile device (and its assigned level of privilege) with a certain quality of a ranging service, as will also be seen. Likewise, any suitable combination of parameters may be used herein, in whole or in part, or otherwise considered.

Thus, at times, a mobile device located within an indoor or like area of interest may communicate one or more messages to a suitable server (e.g., server 116, 118, 120, etc. of FIG. 1) using one or more proximate wireless transmitters (e.g., base station transceiver 108, local transceiver 112, etc. of FIG. 1), for example, and may request access to a ranging and/or localization service based on RTT measurements via an appropriate or applicable wireless communications standard and/or protocol. For example, in some instances, a mobile device may request access to a ranging and/or localization service based on RTT measurements utilizing an exchange of FTM/FTMR messages, such as in connection with the IEEE 802.11v std., just to illustrate one possible implementation. Briefly, for purposes of explanation, as illustrated via an example network communications diagram 300 of FIG. 3, a mobile device initiating a ranging service, referenced herein as a receiving station (Receiving STA), may, for example, transmit an FTM request 302 to a proximate wireless transmitter, referenced herein as a sending station (Sending STA). A wireless transmitter may, for example, generate and transmit a response message, illustrated herein via an FTM acknowledgement (ACK) frame 304.

As also seen, a mobile device and a wireless transmitter may exchange a number of subsequent FTM frames and responses to the FTM frames/acknowledgements (ACKs), such as, for example, to record and/or share respective measurements of transmission and arrival times. Here, measurements of transmission and arrival times may comprise, for example, one or more time of departure (TOD) measurements and one or more time of arrival (TOA) measurements, respectively, of communicated FTM/FTMR frames. For example, a wireless transmitter may transmit to a mobile device via an FTM frame 310 (e.g., in a payload, etc.) a TOD measurement recorded (e.g., via a time stamp, etc.) at time t1 and a TOA measurement recorded at time t4, such as after transmitting a response message (M) 306 (in response to FTMR 302, etc.) to the mobile device and in response to an ACK message 308 subsequently received from the mobile device.

Here, a mobile device may record a TOA measurement of the above response message 306, such as with reference to reception time t2, for example, and may record a TOD measurement of the above ACK message 308, such as with reference to transmission time t3. Thus, with knowledge of transmission and reception times t1, t2, t3, and t4, a mobile device may be capable of computing or estimating an RTT to an applicable wireless transmitter as, for example:

$$RTT=(t4-t1)-(t3-t2)$$

Continuing with the above discussion and using diagram 300 as an example, while requesting a ranging and/or localization service based on RTT measurements (e.g., via FTM request 302, etc.), a mobile device may, for example, communicate (e.g., in connection with operation 202 of FIG. 2A, etc.) one or more parameters to a suitable server. By way of example but not limitation, in at least one implementation, one or more parameters may be communicated via a payload of FTMR 302, for example, and may comprise appropriate and/or applicable information regarding a requesting mobile device, as discussed below. As will also be seen, a proximate wireless transmitter may, for example, include a particular level of privilege and/or service plan for one or more mobile devices of interest, such as in a payload of ACK message 304, if applicable. At times, privilege and/or service plan determination may, for example, be implemented by or at a proximate wireless transmitter, if suitable, and/or at an applicable backend server, which may determine and inform the wireless transmitter of the applicable level of privilege and/or service plan, for example.

In an implementation, mobile device privilege-related information may include, for example, non-secure information, such as, for example, deviceType (e.g., 0: laptop, 1: phone, 2: mobile equipment, . . . ), modelName (e.g., "Galaxy S6"), OSName (e.g., "Android"), OSVer (e.g., "4.1"), RTTCapability (e.g., 0: None, 1: RTS/CTS only, 2: FTM, . . . ), PreferredRTTService (e.g., 1: RTS/CTS only, 2: FTM, . . . ), PreferredRTTAccuracy (e.g., "1 meter" or "30 meter"), IZatServiceLevel (e.g., 0: Basic, 1: Premium), or the like. More secure information may, for example, be exchanged after mutual authentication, such as using one or more appropriate techniques, and may include, for example, association Name (e.g., "Company Name"), associationType (e.g., 0: employee, 1: temporary worker, 2: visitor), or the like. In response, such as via a payload of any suitable response message (e.g., ACK message 304, response message 306, etc.), as was indicated, a proximate wireless transmitter may include a determined level of privilege and/or service plan applicable to a particular mobile device, such as, for example, supportedServiceType (e.g., 0: No RTT, 1: RTS/CTS only, 2: FTM), supportedServiceInterval (e.g., "1 sec" or "2 min"), supportedServiceAccuracy (e.g., "2 meter", or "30 meter"), or the like. Of course, these are merely details relating to example messages, formats, etc., and claimed subject matter is not so limited.

At times, if ACK frame 304 indicates that a ranging and/or localization service based on RTT measurements via a more accurate FTM/FTMR message exchange is unavailable, for example, the message exchange may be terminated, such as after communication of ACK frame 304, as one possible example. In such a case, a level of privilege may, for example, be determined, at least in part, via any other suitable message exchange, such as probe request/response, authentication request/response, association request/response, RTS/CTS, or the like, such as in a similar fashion. For example, RTS and/or CTS frames may comprise one or more optional payloads and/or values, such as supporting a privilege report and/or service plan description. In some instances, such as if a higher level or privilege is requested and/or applicable, for example, a message exchange may be implemented, at least in part, via association of request/response messages and/or at higher-level protocol authentication (e.g., entering "Company employee ID," etc. at a suitable prompt window, etc.). Again, claimed subject matter is not limited to particular message exchanges, communication protocols, formats, or the like.

As referenced generally via an arrow at 314, in some instances, the above network communications process of estimating an RTT measurement may, for example, be repeated, in whole or in part, such as in connection with updating, refining, etc. a position fix of a mobile device, if applicable. As was indicated, while an exchange of FTM/FTMR messages, such as messages 302-312, for example, may yield a more accurate range, transmission of multiple packets over a communication medium for every RTT measurement, however, may reduce wireless throughout, increase power consumption of a mobile device, tax available bandwidth, or the like. As such, at times, it may be desirable and/or useful to limit access in some manner to a higher-accuracy and/or more operationally expensive RTT measurements, such as one or more RTT measurements obtained via an FTM/FTMR message exchange, for example. In some instances, limiting such access may, for example, be based, at least in part, on mobile device privilege, as discussed below.

Thus, referring back to process 200 of FIG. 2A, at operation 204, a level of privilege of the mobile device based, at least in part, on the one or more parameters in the one or more messages received from the mobile device may, for example, be determined. As was indicated, initially, a level of privilege to receive a particular quality of a ranging service may, for example, be assigned to a mobile device, such as by a suitable server (e.g., server 116, 118, 120, etc. of FIG. 1), as one example, based, at least in part on a relationship and/or association of the mobile device with a communications network, wireless service provider, venue operator, employer, or the like. For example, a particular employer may desire to provide its employees with higher accuracy positioning (than its visitors or guests), such as within its offices, buildings, sites, or other areas. As such, an employer may, for example, implement different privilege levels, such as to allow employees to access a higher quality ranging and/or localization service based on RTT measurements utilizing an exchange of FTM/FTMR messages, as one possible example, and/or limit visitors or guests to a lower or degrade quality of service, such as a ranging and/or localization service based on RTT measurements utilizing an exchange of RTS/CTS messages, as another example. Particular examples of different qualities of a ranging and/or localization service that may be implemented in connection with different privilege levels will be described in greater detail below.

Likewise, a wireless service provider may, for example, desire to reward its customers subscribing to a particular service level (e.g., iZat™ Premium, etc.) with higher accuracy positioning than other customers, such as customers subscribing to a lower level of wireless service (e.g., iZat™ Basic, etc.), for example. Similarly, here, a service provider may, for example, assign different levels of privilege depending on a subscription (e.g., assign a higher privilege level for its premium service customers and a lower privilege level for the rest of the customers, etc.). In addition, a venue operator may, for example, discover that particular models of mobile devices, such as older laptops, cellular phones, etc., mobile devices with certain operating systems may affect in some manner wireless throughput within a venue, such as relative to other mobile devices (e.g., newer cellular phones, etc.). As such, a venue operator may, for example, assign different privilege levels to different mobile devices, such as to allow some mobile devices (e.g., cellular phones running on Android 4.0, iOS8, etc.) but not others (e.g., cellular phones operating on Android 1.0, iOS3, etc., certain laptops, etc.) to implement higher accuracy positioning, such as via an FTM/FTMR message exchange, for example.

More specifically, in an implementation, a level of privilege may, for example, be assigned to a mobile device and may be represented, at least in part, via one or more mobile device-related parameters. Here, any suitable parameters, such as, for example, parameters capable of identifying a particular mobile device (e.g., a MAC address, model, etc.), describing its communication and/or processing capabilities (e.g., an operating system, ranging capability, etc.), describing its wireless subscription and/or service (e.g., wireless service-related parameter, etc.), or the like may be used, in whole or in part. As a way of illustration, such as using one of the above examples, an employer may assign a higher level of privilege to mobile devices of its employees (e.g., as "Company Employee," etc.), for example, and may treat other mobile devices as having a lower-tiered level of privilege (e.g., as "Company Guest," etc.). For example, an employer may map or link (e.g., electronically, etc.) one or more parameters, such as a MAC address of a particular mobile device with a certain level of privilege and may store such a mapping or linking in a suitable database, such as a mobile device privilege database, just to illustrate one possible implementation. Depending on an implementation, such a database may, for example, be accessible by a mobile device, suitable server, or any combination thereof.

Figure 3:
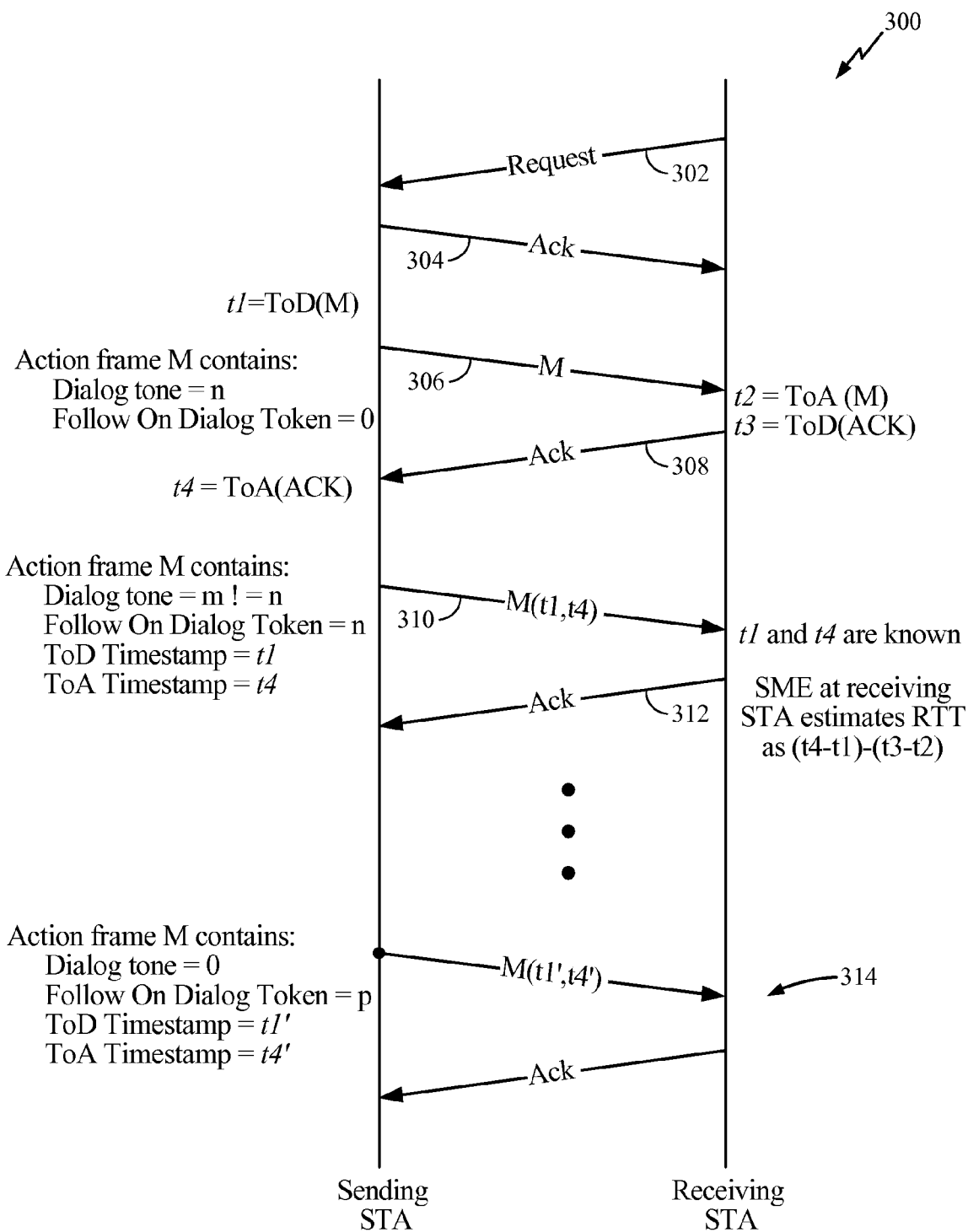
FIG. 3 is an example network communications diagram of an FTM/FTMR message exchange.

Continuing with the above example, thus, in some instances, a mobile device may communicate one or more parameters, such as its MAC address, for example, to a server, such as in connection with operation 202 of FIG. 2A, via FTM request 302 of FIG. 3, etc., just to illustrate a few possible implementations. In turn, having received the MAC address, a server may, for example, access a suitable database (e.g., a mobile device privilege database, etc.) and may determine a level of privilege of a communicating mobile device. For example, a server may recognize that a received MAC address belongs to a mobile device of a particular employee (e.g., "Company Employee," etc.), such as by matching the received MAC address to MAC addresses stored in the database. Having found a match, a server may, for example, further determine that the MAC address is mapped or linked to a certain level of privilege (e.g., as assigned by an employer, etc.) and may provide a quality of a ranging and/or localization service corresponding to that level of privilege, as will be seen. If no match is found, a server may, for example, treat a communicating mobile device as having a lower level of privilege (e.g., as "Company Guest," etc.) and may limit in some manner access of such a mobile device to a higher accuracy ranging and/or localization service based on RTT measurements, as also discussed below. Again, it should be noted that a MAC address is used herein as an example parameter, such as for purposes of illustration, and that other parameters may be utilized herein, in whole or in part, such as one or more parameters discussed above. Thus, one or more matching operations may, for example, be performed, at least in part, with respect to other suitable parameters, such as in a similar fashion. For example, a server associated with a venue operator may be capable of matching a particular version of an operating system (e.g., communicated as a mobile device-related parameter via one or more messages, etc.) of a communicating mobile device requesting a ranging and/or localization service within a venue, such as by accessing a suitable database.

In at least one implementation, one or more parameters may comprise, for example, a parameter associating (e.g., linking, mapping, etc.) a communicating mobile device (and its assigned level of privilege) with a quality of a ranging and/or localization service to be received by such a mobile device. At times, such a parameter may be implemented to facilitate or support a more efficient and/or more effective determination of a level of mobile device's privilege, for example, and may be represented via any suitable value (e.g., binary value, etc.), character, or the like, or any combination thereof. As a way of illustration, a wireless service provider may, for example, assign a binary "1" to its mobile devices subscribing to a premium level of a wireless service and may assign a binary "0" to mobile devices subscribing to a basic level of service. Thus, a communicating mobile device may request a particular ranging service, such as a ranging and/or localization service based on RTT measurements via FTM request 302, for example, while communicating a specific parameter associating (e.g., linking, mapping, etc.) a communicating mobile device (and its assigned level of privilege) with a quality of a ranging and/or localization service in a payload. Here, in case of a "1," a server may allow an RTT measurement via an FTM/FTMR message exchange, for example, or may deny such an exchange and limit the mobile device to an RTT measurement via an RTS/CTS message exchange, just to illustrate one possible implementation.

Depending on an implementation, a parameter associating (e.g., linking, mapping, etc.) a communicating mobile device (and its assigned level of privilege) with a quality of a ranging and/or localization service may, for example, be stored in a local memory of a mobile device, applicable server, suitable database, etc., or any combination thereof. For example, in some instances, a mobile device may communicate a locally stored parameter associating (e.g., linking, mapping, etc.) a communicating mobile device (and its assigned level of privilege) with a quality of a ranging and/or localization service (e.g., via operation 202 of FIG. 2A, etc.), and a server may determine a corresponding level of privilege, such as via one or more matching operations discussed above, as an illustration. At times, a mobile device may, for example, access a suitable database (e.g., a mobile device privilege database, etc.) and may obtain an applicable parameter associating (e.g., linking, mapping, etc.) a communicating mobile device (and its assigned level of privilege) with a quality of a ranging and/or localization service, such as also for purposes of communicating with a server in support of a ranging and/or localization service (e.g., in connection with operation 202 of FIG. 2A, etc.). Likewise, based, at least in part, on a received parameter associating (e.g., linking, mapping, etc.) a communicating mobile device (and its assigned level of privilege) with a quality of a ranging and/or localization service, a server may, for example, determine a level of privilege for a communicating mobile device, such as without or without accessing a database and/or matching operation discussed above, and may provide an applicable quality of a ranging service. A parameter associating (e.g., linking, mapping, etc.) a communicating mobile device (and its assigned level of privilege) with a quality of a ranging and/or localization service may also be used, at least in part, in combination with any other suitable information employed to determine a particular level of privilege to receive a quality of a ranging and/or localization service and may be communicated via one or more frames of an applicable message exchange, such as an FTM/FTMR message exchange discussed above, for example.

As was indicated, having determined a particular level of privilege to receive a quality of a ranging and/or localization service that may be based, at least in part, on an exchange of messages (e.g., via FTM/FTMR, RTS/CTS, etc. frames, etc.) between a mobile device (e.g., a communicating mobile device requesting measurements in support of a ranging service, etc.) and one or more wireless transmitters (e.g., Wi-Fi access points, etc.), a server may, for example, determine and/or provide a quality of a ranging and/or localization service corresponding to such a level of privilege. For example, in some instances, such as if it is determined that a higher level of privilege is applicable or appropriate, a server may grant access to a communicating mobile device to a ranging and/or localization service based on RTT measurements via an exchange of one or more higher accuracy FTM/FTMR messages, such as discussed above in connection with FIG. 3. In some instances, a server may, for example, acknowledge or confirm such a determination to a communicating mobile device via one or more appropriate responses. By way of example but not limitation, at times, a server may implement this via FTM ACK frame 304 of FIG. 3, just to illustrate one possible implementation. For this example, receipt of FTM ACK frame 304 by a communicating mobile device may, for example, prompt the mobile device to start recording arrival and transmission times of applicable message or action frames, such as times t2 and t3 also discussed above in connection with FIG. 3. Optionally or alternatively, to acknowledge or confirm an appropriate determination of a mobile device's privilege level, for example, response message 306 of FIG. 3 may also be utilized, at least in part.

In some instances, such as if it is determined that a higher quality of a ranging service, such as a ranging and/or localization service based on RTT measurements using an exchange of higher accuracy FTM/FTMR frames, for example, is not warranted or applicable (e.g., a mobile device belongs to someone other than a "Company Employee," such as a "Company Guest," etc.), a server may limit access to such a ranging and/or localization service in some manner. For example, a server may transmit an appropriate message to a communicating mobile device, such as via FTM ACK frame 304 of FIG. 3, as one example, or CTS message frame, as another example, or any other suitable message/frame indicating that a higher accuracy ranging and/or localization service based on RTT measurements is not available. Here, in such a message, a server may, for example, also include a communication (or like indication) offering a mobile device a ranging and/or localization service based on RTT measurements with a lower accuracy, such as using an RTS/CTS message exchange, as one possible example, which the mobile device may or may not accept. Optionally or alternatively, for a mobile device with a lower-tiered level of privilege, a server may implement a ranging and/or localization service based on RTT measurements via an exchange of RTS/CTS messages, such as without a notification or message that a higher accuracy ranging and/or localization service based on RTT measurements is not available, for example.

In some implementations, such as for a mobile device with a lower-tiered level of privilege, for example, a server may limit frequency or periodicity of RTT measurements of a particular message exchange or any combination thereof. For example, at times, a server may allow only a certain number of RTT measurements of an FTM/FTMR message exchange within a certain time period (e.g., one RTT measurement using FTM/FTMR frames within a five-minute time period, etc.). As another example, at times, a server may allow only a certain number of RTT measurements of an RTS/CTS message exchange within a certain time period (e.g., one RTT measurement using FTM/FTMR frames within a ten-second time period, etc.). As yet another example, in some instances, within a five-minute time period, a server may allow only one RTT measurement using FTM/FTMR frames, for example, and only ten RTT measurements using an RTS/CTS message exchange, such as implemented in any suitable sequence.

In an implementation, any suitable combination of privilege levels may, for example, be employed, in whole or in part. Thus, as a way of illustration, using payload values, as applicable, a privilege determination as, for example, "CompanyEmployee & IZatPremium" may allow for FTM/FTMR messaging with 1.0 second interval, "CompanyEmployee & IZatBasic" may allow for FTM/FTMR messaging with 30.0 second interval, "CompanyGuest & IZatPremium" may allow for RTT-based 10.0 meters accuracy (via FTM/FTM or RTS/CTS messaging) with 1.0 second interval, "CompanyGuest & IZatBasic" may allow for RTT-based 10.0 meters accuracy (via FTM/FTM or RTS/CTS messaging) with 30.0 second interval, or the like. At times, foe mobile devices having a basic or lower-level service plan, RTT measurements may be spaced apart for 1.0 minute (or more), as one example, which may incentivize associated users to acquire a higher-level service plan. Of course, these are merely details relating to privilege levels, limiting frequency or periodicity of RTT measurements, etc., and claimed subject matter is not so limited. Any other suitable sequences, time periods, combinations, frames, etc., may be employed herein, in whole or in part, or otherwise considered.

At times, for a mobile device with a lower-tiered level of privilege, for example, a quality of a ranging and/or localization service may be degraded to some extent, at least in part, by injecting or introducing a random error into one or more frames of a particular message exchange (e.g., an FTM/FTMR, RTS/CTS, etc. message exchange, etc.), such as to affect RTT ranging accuracy. For example, a server may intentionally adjust and/or misreport one or more transmission and/or arrival times of FTM/FTMR frames, such as times t1 and/or t4 of FIG. 3, as a few examples, such as on the order of tens of nanoseconds or a few meters in position, just to illustrate one possible implementation. In some instances, such as for certain lower-tiered mobile devices, a server may also provide positioning assistance data with time-varying or other errors (e.g., errors in reporting locations of one or more wireless transmitters, etc.), for example, so as to degrade a quality of RTT ranging accuracy up to a certain number of meters, which may depend on a mobile device, level of privilege, wireless signals, associated wireless environment, etc. These or like techniques are generally known and need not be described here in greater detail. Accordingly, here, depending on an applicable level of a privilege, a quality of a ranging service, such as represented via a suitable intentional deviation in a position fix, for example, may be adjusted or varied appropriately.

In some instances, a quality of a ranging and/or localization service may depend, at least in part, on a ranging capability of a communicating mobile device. For example, if a mobile device does not have a capability to measure applicable ranges via an exchange of RTS/CTS messages, the mobile device may communicate such a capability to a suitable server. At times, a mobile device may, for example, communicate such a capability via one or more messages in connection with a request to obtain measurements in support of a ranging service, just to illustrate one possible implementation. In turn, a server may implement a ranging and/or localization service based on RTT measurements, such as using one or more operations or techniques discussed herein, via an exchange of FTM/FTMR message frames, if applicable or appropriate. Likewise, if a communicating mobile device does not have a capability to exchange FTM/FTMR message frames, for example, a serve may implement a ranging and/or localization service based on RTT measurements via an RTS/CTS message exchange, if applicable or appropriate.

Figure 2B:
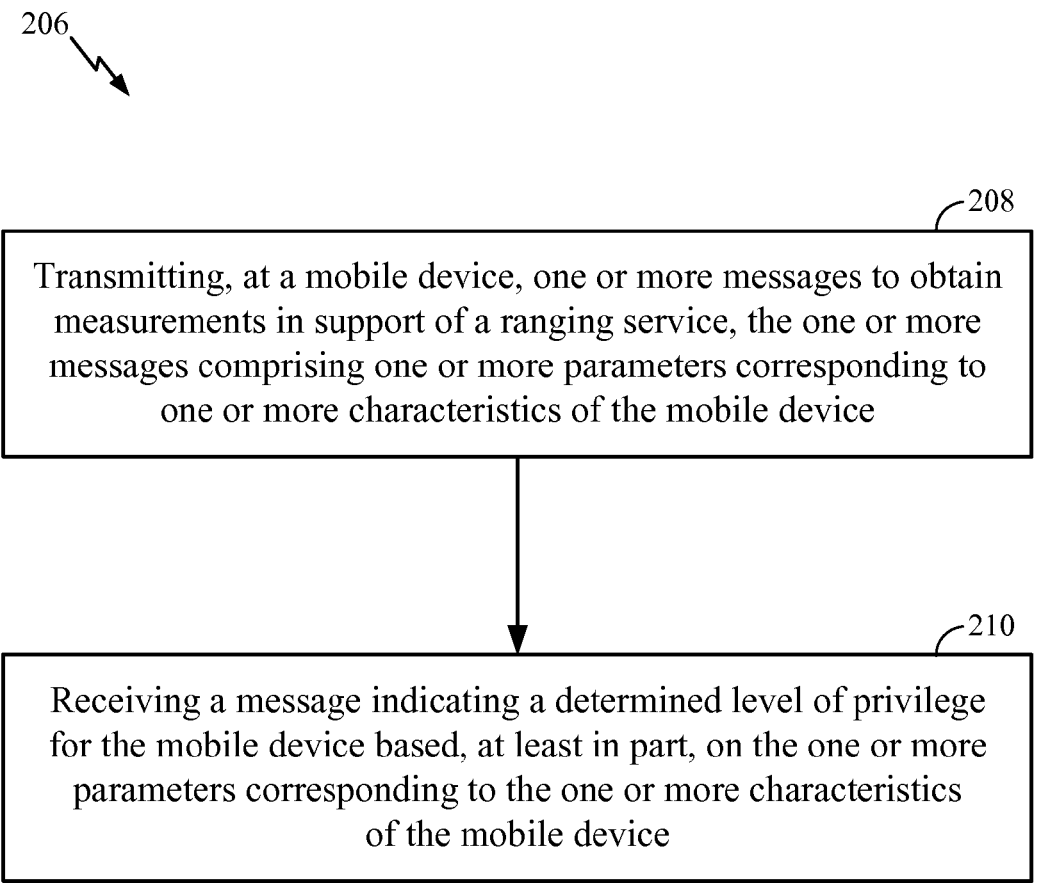
FIG. 2B is a flow diagram illustrating another implementation of an example process that may be performed to facilitate or support a ranging and/or localization service based, at least in part, on mobile device privilege.

FIG. 2B is a flow diagram illustrating another implementation of an example process, referenced herein at 206, that may be performed, in whole or in part, to facilitate or support one or more operations and/or techniques for a ranging and/or localization service based, at least in part, on privilege of a particular mobile device, such as location-aware mobile device 102 of FIG. 1, for example. Likewise, it should be noted that information acquired or produced, such as, for example, input signals, output signals, operations, results, etc. associated with example process 206 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process 206 may, for example, begin at operation 208 with transmitting, at a mobile device, one or more messages to obtain measurements in support of a ranging service, the one or more messages comprising one or more parameters corresponding to one or more characteristics of the mobile device. As discussed above, depending on an implementation, one or more parameters may comprise, for example, a MAC address, model, operating system, ranging capability, etc. of a mobile device, a parameter associating a mobile device (and its assigned level of privilege) with a certain quality of a ranging service, etc., or any combination thereof. A mobile device may, for example, transmit one or more messages comprising one or more parameters to a suitable server using one or more proximate wireless transmitters (e.g., base station transceiver 108, local transceiver 112, etc. of FIG. 1), and may request access to a ranging and/or localization service (e.g., via FTM request 302 of FIG. 3, etc.) based on RTT measurements via an appropriate or applicable wireless communications standard and/or protocol, as was also discussed above. Here, if appropriate, a mobile device and a suitable server may, for example, exchange a number of applicable frames and responses to these frames/acknowledgements (ACKs), such as to facilitate or support computing or estimating an RTT to an applicable wireless transmitter, such as in the manner similar to an example message exchange of FIG. 3. In some instances, a server may, for example, use one or more transmitted parameters, at least in part, to determine a level of privilege with respect to a requesting mobile device, such as discussed above and/or in a similar fashion, though claimed subject matter is not so limited. For example, at times, a level of privilege may be determined, at least in part, by or at a proximate wireless transmitter, if suitable, and/or at an applicable backend server, which may determine and inform the wireless transmitter of the applicable level of privilege and/or service plan, for example.

Thus, with regard to operation 210, a message indicating a determined level of privilege for the mobile device may, for example, be received based, at least in part, on the one or more parameters corresponding to the one or more characteristics of the mobile device. Having received such a message, a mobile device may, for example, implement a quality of a ranging and/or localization service corresponding to a determined (and communicated) level of privilege. For example, in some instances, such as if a message indicates that a higher level of privilege is applicable or appropriate, a mobile device may access a ranging and/or localization service based on RTT measurements via an exchange of one or more higher accuracy FTM/FTMR messages, such as discussed above in connection with FIG. 3. For this example, receipt of such a message by a mobile device may, for example, prompt the mobile device to start recording arrival and transmission times of applicable message or action frames, such as times t2 and t3 also discussed above in connection with FIG. 3.

In some instances, such as if a message indicates that a higher quality of a ranging service, such as a ranging and/or localization service based on RTT measurements using an exchange of higher accuracy FTM/FTMR frames, for example, is not warranted or applicable (e.g., a mobile device belongs to someone other than a "Company Employee," such as a "Company Guest," etc.), access by a mobile device to a higher accuracy ranging and/or localization service may be limited, such as in the manner discussed above (e.g., via limiting frequency, periodicity, etc. of RTT measurements of a particular message exchange, etc.). At times, for a mobile device with a lower-tiered level of privilege, for example, a quality of a ranging and/or localization service may be degraded to some extent, at least in part, by injecting or introducing a random error into one or more frames of a particular message exchange (e.g., an FTM/FTMR, RTS/CTS, etc. message exchange, etc.), such as to affect RTT ranging accuracy, as was also indicated. Likewise, here, a quality of a ranging and/or localization service may also depend, at least in part, on a ranging capability of a communicating mobile device and may be implemented, in whole or in part, via one or more operations or techniques discussed herein.

Figure 4:
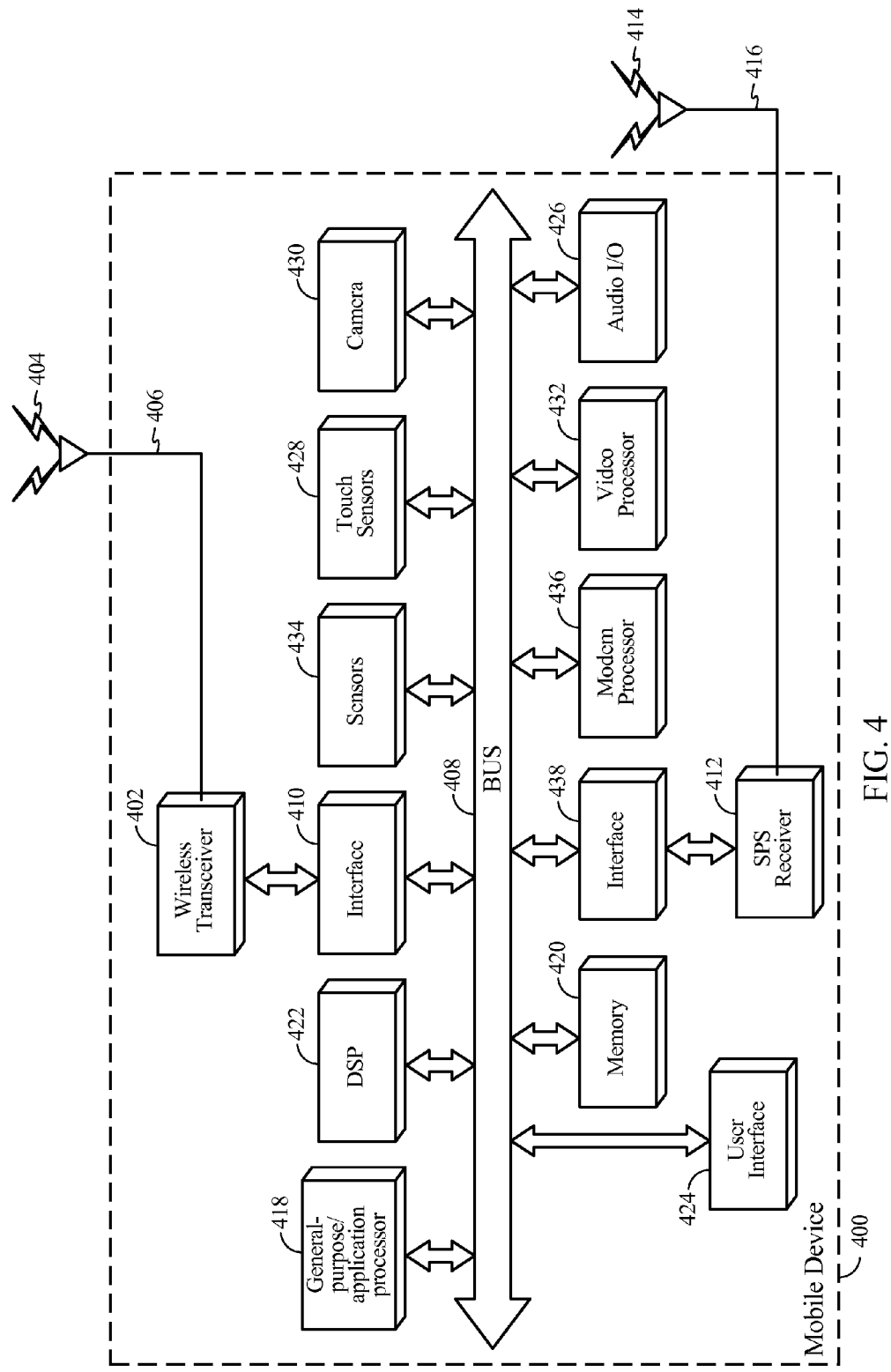
FIG. 4 is a schematic diagram illustrating an implementation of an example computing environment associated with a mobile device.

FIG. 4 is a schematic diagram of an implementation of an example computing environment associated with a mobile device that may be used, at least in part, to facilitate or support one or more operations or processes for a ranging and/or localization service based, at least in part, on mobile device privilege. An example computing environment may comprise, for example, a mobile device 400 that may include one or more features or aspects of mobile device 102 of FIG. 1, though claimed subject matter is not so limited. For example, in some instances, mobile device 400 may comprise a wireless transceiver 402 capable of transmitting or receiving wireless signals, referenced generally at 404, such as via an antenna 406 over a suitable wireless communications network. Wireless transceiver 402 may, for example, be capable of sending or receiving one or more suitable communications, such as one or more communications discussed with reference to FIGS. 1-3. Wireless transceiver 402 may, for example, be coupled or connected to a bus 408 via a wireless transceiver bus interface 410. Depending on an implementation, at times, wireless transceiver bus interface 410 may, for example, be at least partially integrated with wireless transceiver 402. Some implementations may include multiple wireless transceivers 402 or antennas 406 so as to enable transmitting or receiving signals according to a corresponding multiple wireless communication standards such as Wireless Local Area Network (WLAN) or Wi-Fi, Code Division Multiple Access (CDMA), Wideband-CDMA (W-CDMA), Long Term Evolution (LTE), Bluetooth®, just to name a few examples.

In an implementation, mobile device 400 may, for example, comprise an SPS or like receiver 412 capable of receiving or acquiring one or more SPS or other suitable wireless signals 414, such as via an SPS or like antenna 416. SPS receiver 412 may process, in whole or in part, one or more acquired SPS signals 414 for determining a location of mobile device 400. In some instances, one or more general-purpose application processors 418 (henceforth referred to as "processor"), memory 420, digital signal processor(s) (DSP) 422, or like specialized devices or processors not shown may be utilized to process acquired SPS signals 414, in whole or in part, calculate a location of mobile device 400, such as in conjunction with SPS receiver 412, or the like. Storage of SPS or other signals for implementing one or more positioning operations, such as in connection with one or more techniques for a ranging and/or localization service based, at least in part, on mobile device privilege, for example, may be performed, at least in part, in memory 420, suitable registers or buffers (not shown). Although not shown, it should be appreciated that in at least one implementation one or more processors 418, memory 420, DSPs 422, or like specialized devices or processors may comprise one or more processing modules capable of receiving one or more messages from mobile device 400 to obtain measurements in support of the ranging service, the one or more messages comprising one or more parameters corresponding to one or more characteristics of mobile device 400; and determining a level of privilege of mobile device 400 based, at least in part, on the one or more parameters in the one or more messages received from mobile device 400.

It should be noted that all or part of one or more processing modules may be implemented using or otherwise including hardware, firmware, software, or any combination thereof. Processing modules may be representative of one or more circuits capable of performing at least a portion of information computing technique or process. By way of example but not limitation, processor 418 or DSP 422 may include one or more processors, controllers, microprocessors, microcontrollers, application specific integrated circuits, digital signal processors, programmable logic devices, field programmable gate arrays, or the like, or any combination thereof. Thus, at times, processor 418 or DSP 422 or any combination thereof may comprise or be representative of means for receiving one or more messages from mobile device 400 to obtain measurements in support of the ranging service, the one or more messages comprising one or more parameters corresponding to one or more characteristics of mobile device 400, such as to implement operation 202 of FIG. 2A, at least in part. In addition, in at least one implementation, processor 418 or DSP 422 may be representative of or comprise, for example, means for determining a level of privilege of mobile device 400 based, at least in part, on the one or more parameters in the one or more messages received from mobile device 400, such as to implement operation 204 of FIG. 2A, at least in part.

As illustrated, DSP 422 may be coupled or connected to processor 418 and memory 420 via bus 408. Although not shown, in some instances, bus 408 may comprise one or more bus interfaces that may be integrated with one or more applicable components of mobile device 400, such as DSP 422, processor 418, memory 420, or the like. In various embodiments, one or more operations or functions described herein may be performed in response to execution of one or more machine-readable instructions stored in memory 420, such as on a computer-readable storage medium, such as RAM, ROM, FLASH, disc drive, etc., just to name a few examples. Instructions may, for example, be executable via processor 418, one or more specialized processors not shown, DSP 422, or the like. Memory 420 may comprise a non-transitory processor-readable memory, computer-readable memory, etc. that may store software code (e.g., programming code, instructions, etc.) that may be executable by processor 418, DSP 422, or the like to perform operations or functions described herein.

Mobile device 400 may comprise a user interface 424, which may include any one of several devices such as, for example, a speaker, microphone, display device, vibration device, keyboard, touch screen, etc., just to name a few examples. In at least one implementation, user interface 424 may enable a user to interact with one or more applications hosted on mobile device 400. For example, one or more devices of user interface 424 may store analog or digital signals on memory 420 to be further processed by DSP 422, processor 418, etc. in response to input or action from a user. Similarly, one or more applications hosted on mobile device 400 may store analog or digital signals in memory 420 to present an output signal to a user. In some implementations, mobile device 400 may optionally include a dedicated audio input/output (I/O) device 426 comprising, for example, a dedicated speaker, microphone, digital to analog circuitry, analog to digital circuitry, amplifiers, gain control, or the like. It should be understood, however, that this is merely an example of how audio I/O device 426 may be implemented, and that claimed subject matter is not limited in this respect. As seen, mobile device 400 may comprise one or more touch sensors 428 responsive to touching or like pressure applied on a keyboard, touch screen, or the like.

In an implementation, mobile device 400 may comprise, for example, a camera 440, dedicated or otherwise, such as for capturing still or moving imagery, or the like. Camera 440 may comprise, for example, a camera sensor or like imaging device (e.g., charge coupled device, complementary metal oxide semiconductor (CMOS)-type imager, etc.), lens, analog to digital circuitry, frame buffers, etc., just to name a few examples. In some instances, additional processing, conditioning, encoding, or compression of signals representing one or more captured images may, for example, be performed, at least in part, at processor 418, DSP 422, or the like. Optionally or alternatively, a video processor 432, dedicated or otherwise, may perform conditioning, encoding, compression, or manipulation of signals representing one or more captured images. Additionally, video processor 432 may, for example, decode or decompress one or more stored images for presentation on a display (not shown) of mobile device 400.

Mobile device 400 may comprise one or more sensors 434 coupled or connected to bus 408, such as, for example, one or more inertial sensors, ambient environment sensors, or the like. Inertial sensors of sensors 434 may comprise, for example, one or more accelerometers (e.g., collectively responding to acceleration of mobile device 400 in one, two, or three dimensions, etc.), gyroscopes or magnetometers (e.g., to support one or more compass or like applications, etc.), etc., just to illustrate a few examples. Ambient environment sensors of mobile device 400 may comprise, for example, one or more barometric pressure sensors, temperature sensors, ambient light detectors, camera sensors, microphones, etc., just to name few examples. Sensors 434 may generate analog or digital signals that may be stored in memory 420 and may be processed by DSP 422, processor 418, etc., such as in support of one or more applications directed to positioning or navigation operations, wireless communications, radio heat map learning, video gaming or the like.

In a particular implementation, mobile device 400 may comprise, for example, a modem processor 436, dedicated or otherwise, capable of performing baseband processing of signals received or downconverted via wireless transceiver 402, SPS receiver 412, or the like. Similarly, modem processor 436 may perform baseband processing of signals to be upconverted for transmission via wireless transceiver 402, for example. In alternative implementations, instead of having a dedicated modem processor, baseband processing may be performed, at least in part, by processor 418, DSP 422, or the like. In addition, in some instances, an interface 438, although illustrated as a separate component, may be integrated, in whole or in part, with one or more applicable components of mobile device 400, such as bus 408 or SPS receiver 412, for example. Optionally or alternatively, SPS receiver 412 may be coupled or connected to bus 408 directly. It should be understood, however, that these are merely examples of components or structures that may perform baseband processing, and that claimed subject matter is not limited in this regard.

Figure 5:
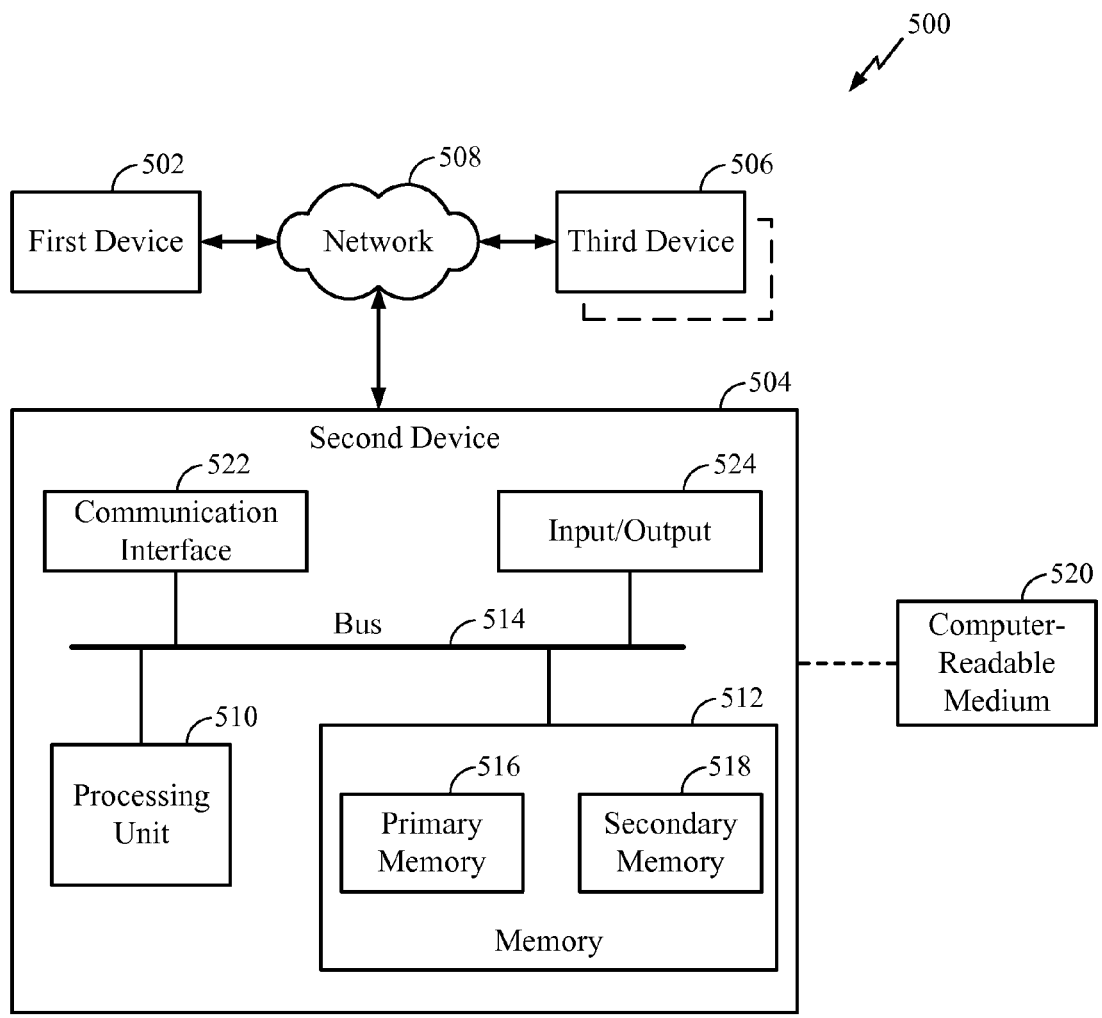
FIG. 5 is a schematic diagram illustrating an implementation of an example computing environment associated with a server.

FIG. 5 is a schematic diagram illustrating an implementation of an example computing environment or system 500 that may be associated with or include one or more servers or other devices capable of partially or substantially implementing or supporting one or more operations or processes for a ranging and/or localization service based, at least in part, on mobile device privilege, such as discussed above in connection with FIGS. 1-3, for example. Computing environment 500 may include, for example, a first device 502, a second device 504, a third device 506, etc., which may be operatively coupled together via a communications network 508. In some instances, first device 502 may comprise a server capable of providing positioning assistance parameters, such as, for example, identities, locations, etc. of known wireless transmitters, radio heat map, base station almanac, electronic digital map, database of wireless transmitters, bias estimates, signal measurements, or the like. For example, first device 502 may also comprise a server capable of providing an electronic digital map to a mobile device based, at least in part, on a coarse or rough estimate of a location of the mobile device, upon request, or the like. First device 502 may also comprise a server capable of providing any other suitable positioning assistance parameters (e.g., an electronic digital map, radio heat map, etc.), relevant to a location of a mobile device. Second device 504 or third device 506 may comprise, for example, mobile devices, though claimed subject matter is not so limited. For example, in some instances, second device 504 may comprise a server functionally or structurally similar to first device 502, just to illustrate another possible implementation. In addition, communications network 508 may comprise, for example, one or more wireless transmitters, such as access points, femtocells, or the like. Of course, claimed subject matter is not limited in scope in these respects.

First device 502, second device 504, or third device 506 may be representative of any device, appliance, platform, or machine that may be capable of exchanging parameters and/or information over communications network 508. By way of example but not limitation, any of first device 502, second device 504, or third device 506 may include: one or more computing devices or platforms, such as, for example, a desktop computer, a laptop computer, a workstation, a server device, or the like; one or more personal computing or communication devices or appliances, such as, for example, a personal digital assistant, mobile communication device, or the like; a computing system or associated service provider capability, such as, for example, a database or information storage service provider/system, a network service provider/system, an Internet or intranet service provider/system, a portal or search engine service provider/system, a wireless communication service provider/system; or any combination thereof. Any of first, second, or third devices 502, 504, and 506, respectively, may comprise one or more of a mobile device, wireless transmitter or receiver, server, etc. in accordance with example implementations described herein.

In an implementation, communications network 508 may be representative of one or more communication links, processes, or resources capable of supporting an exchange of information between at least two of first device 502, second device 504, or third device 506. By way of example but not limitation, communications network 508 may include wireless or wired communication links, telephone or telecommunications systems, information buses or channels, optical fibers, terrestrial or space vehicle resources, local area networks, wide area networks, intranets, the Internet, routers or switches, and the like, or any combination thereof. As illustrated, for example, via a dashed lined box partially obscured by third device 506, there may be additional like devices operatively coupled to communications network 508. It is also recognized that all or part of various devices or networks shown in computing environment 500, or processes or methods, as described herein, may be implemented using or otherwise including hardware, firmware, software, or any combination thereof.

By way of example but not limitation, second device 504 may include at least one processing unit 510 that may be operatively coupled to a memory 512 via a bus 514. Processing unit 510 may be representative of one or more circuits capable of performing at least a portion of a suitable computing procedure or process. For example, processing unit 510 may include one or more processors, controllers, microprocessors, microcontrollers, application specific integrated circuits, digital signal processors, programmable logic devices, field programmable gate arrays, or the like, or any combination thereof. Although not shown, second device 504 may include a location-tracking unit that may initiate a position fix of a suitable mobile device, such as in an area of interest, for example, based, at least in part, on one or more received or acquired wireless signals, such as from an SPS, one or more Wi-Fi access points, etc. In some implementations, a location-tracking unit may be at least partially integrated with a suitable processing unit, such as processing unit 510, for example, though claimed subject matter is not so limited. In certain server-based or server-supported implementations, processing unit 510 may, for example, comprise means for receiving one or more messages from a mobile device to obtain measurements in support of the ranging service, the one or more messages comprising one or more parameters corresponding to one or more characteristics of the mobile device, such as to facilitate or support operations 202 and/or 204 of FIG. 2A, at least in part. In some instances, processing unit 510 may, for example, comprise means for determining a level of privilege of the mobile device based, at least in part, on the one or more parameters in the one or more messages received from the mobile device, such as to facilitate or support operations 202 and/or 204 of FIG. 2A, at least in part.

Memory 512 may be representative of any information storage mechanism or appliance. Memory 512 may include, for example, a primary memory 516 and a secondary memory 518. Primary memory 516 may include, for example, a random access memory, read only memory, etc. While illustrated in this example as being separate from processing unit 510, it should be understood that all or part of primary memory 516 may be provided within or otherwise co-located/coupled with processing unit 510. Secondary memory 518 may include, for example, same or similar type of memory as primary memory or one or more information storage devices or systems, such as, for example, a disk drive, an optical disc drive, a tape drive, a solid state memory drive, etc. In certain implementations, secondary memory 518 may be operatively receptive of, or otherwise configurable to couple to, a computer-readable medium 520. Computer-readable medium 520 may include, for example, any non-transitory storage medium that may carry or make accessible information, code, or instructions for one or more of devices in computing environment 500. Computer-readable medium 520 may also be referred to as a machine-readable medium, storage medium, or the like.

Second device 504 may include, for example, a communication interface 522 that may provide for or otherwise support an operative coupling of second device 504 to at least communications network 508. By way of example but not limitation, communication interface 522 may include a network interface device or card, a modem, a router, a switch, a transceiver, and the like. Second device 504 may also include, for example, an input/output device 524. Input/output device 524 may be representative of one or more devices or features that may be configurable to accept or otherwise introduce human or machine inputs, or one or more devices or features that may be capable of delivering or otherwise providing for human or machine outputs. By way of example but not limitation, input/output device 524 may include an operatively configured display, speaker, keyboard, mouse, trackball, touch screen, information port, or the like.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units de-signed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, messages, parameters, frames, packets, content and/or the like. It should be understood, however, that all of these and/or similar terms are to be associated with appropriate physical quantities or manifestations, and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. Likewise, operation of a memory device to store bits, values, elements, symbols, characters, terms, numbers, numerals, measurements, messages, parameters, frames, packets, content and/or the like may comprise a physical transformation. With particular types of memory devices, such a physical transformation may comprise a physical transformation of an article to a different state or thing. For example, but without limitation, for some types of memory devices, a change in state may involve an accumulation and/or storage of charge or a re-lease of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") net-work, a Single-Carrier Frequency Division Multiple Access ("SC-FDMA") network, or any combination of the above networks, and so on.

A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that transmits a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method for providing a ranging service, the method comprising:
   receiving one or more messages from a mobile device to obtain measurements in support of the ranging service, the one or more messages comprising one or more parameters corresponding to one or more characteristics of the mobile device; and
   assigning a level of privilege to the mobile device to receive a particular quality of ranging measurements based, at least in part, on the one or more parameters in the one or more messages received from the mobile device.

2. The method of claim 1, and further comprising determining a quality of the ranging service based, at least in part, on the determined level of the privilege.

3. The method of claim 2, and further comprising transmitting a message to the mobile device if the ranging service is not available to the mobile device, the availability of the ranging service being based, at least in part, on the determined quality of the ranging service.

4. The method of claim 2, and further comprising granting access to the mobile device to a ranging service based on round trip time (RTT) measurements via an exchange of fine timing measurement (FTM)/fine timing measurement request (FTMR) messages.

5. The method of claim 2, and further comprising granting access to the mobile device to a ranging service based on RTT measurements via an exchange of request-to-send (RTS)/clear-to-send (CTS) messages.

6. The method of claim 2, and further comprising granting access to the mobile device to a ranging service based on RTT measurements.

7. The method of claim 2, and further comprising limiting periodicity of an RTT measurement of at least one of the following: an FTM/FTMR message exchange; an RTS/CTS message exchange; or any combination thereof.

8. The method of claim 2, and further comprising degrading the quality of the ranging service for the mobile device via at least one or the following: an introduction of a random error in an RTT measurement; an introduction of a random error in a wireless transmitter location; or any combination thereof.

9. The method of claim 1, wherein the one or more parameters comprise at least one of the following: a Media Access Control (MAC) address of the mobile device; a model of the mobile device; an operating system of the mobile device; a ranging capability of the mobile device; a wireless service-related parameter; a parameter associating the mobile device with the quality of the ranging service; or any combination thereof.

10. The method of claim 1, wherein the determining the level of the privilege further comprises:
    mapping the one or more parameters to the mobile device; and
    determining the level of the privilege based, at least in part, on the one or more mapped parameters.

11. The method of claim 1, wherein the one or more parameters are mapped to the mobile device to associate the level of the privilege with the quality of the ranging service.

12. The method of claim 11, wherein the one or more parameters are mapped to the mobile device in a database accessible by the mobile device.

13. The method of claim 1, wherein the ranging service comprises a ranging service based on RTT measurements.

14. An apparatus for providing a ranging service, the apparatus comprising:
    means for receiving one or more messages from a mobile device to obtain measurements in support of the ranging service, the one or more messages comprising one or more parameters corresponding to one or more characteristics of the mobile device; and
    means for assigning a level of privilege to the mobile device to receive a particular quality of ranging measurements based, at least in part, on the one or more parameters in the one or more messages received from the mobile device.

15. The apparatus of claim 14, wherein the means for the determining the level of the privilege further comprises:
    means for mapping the one or more parameters to the mobile device; and
    means for determining the level of the privilege based, at least in part, on the one or more mapped parameters.

16. The apparatus of claim 15, wherein the one or more parameters are mapped to the mobile device to associate the level of the privilege with a quality of the ranging service.

17. An apparatus for providing a ranging service, the apparatus comprising:
    a wireless transceiver to communicate with an electronic communications network to:
        receive one or more messages from a mobile device to obtain measurements in support of the ranging service, the one or more messages comprising one or more parameters corresponding to one or more characteristics of the mobile device; and
    one or more processors coupled to a memory, the one or more processors and the memory configured to:
        assign a level of privilege to the mobile device to receive a particular quality of ranging measurements based, at least in part, on the one or more parameters in the one or more messages received from the mobile device.

18. The apparatus of claim 17, wherein the one or more processors are further configured to determine a quality of the ranging service to be based, at least in part, on the determined level of the privilege.

19. The apparatus of claim 18, wherein the one or more processors are further configured to transmit a message to the mobile device if the ranging service is not available to the mobile device, the availability of the ranging service is to be based, at least in part, on the determined quality of the ranging service.

20. The apparatus of claim 18, wherein the one or more processors are further configured to grant access to the mobile device to a ranging service based on RTT measurements via an exchange of FTM/FTMR messages.

21. The apparatus of claim 18, wherein the one or more processors are further configured to grant access to the mobile device to a ranging service based on RTT measurements via an exchange of RTS/CTS messages.

22. The apparatus of claim 18, wherein the one or more processors are further configured to grant access to the mobile device to a ranging service based on RTT measurements.

23. The apparatus of claim 18, wherein the one or more processors are further configured to limit periodicity of an RTT measurement of at least one of the following: an FTM/FTMR message exchange; an RTS/CTS message exchange; or any combination thereof.

24. The apparatus of claim 18, wherein the one or more processors are further configured to degrade the quality of the ranging service for the mobile device via at least one or the following: an introduction of a random error in an RTT measurement; an introduction of a random error in a wireless transmitter location; or any combination thereof.

25. The apparatus of claim 17, wherein the one or more parameters comprise at least one of the following: a MAC address of the mobile device; a model of the mobile device; an operating system of the mobile device; a ranging capability of the mobile device; a wireless service-related parameter; a parameter associating the mobile device with the quality of the ranging service; or any combination thereof.

26. The apparatus of claim 17, wherein the one or more processors configured to determine the level of the privilege are further configured to:
    map the one or more parameters to the mobile device; and
    determine the level of the privilege to be based, at least in part, on the one or more mapped parameters.

27. The apparatus of claim 17, wherein the one or more parameters are mapped to the mobile device to associate the level of the privilege with the quality of the ranging service.

28. The apparatus of claim 27, wherein the one or more parameters are mapped to the mobile device in a database accessible by the mobile device.

29. The apparatus of claim 17, wherein the ranging service comprises a ranging service based on RTT measurements.

30. A non-transitory storage medium having instructions executable by a processor to:
    receive one or more messages from a mobile device to obtain measurements in support of the ranging service, the one or more messages comprising one or more parameters corresponding to one or more characteristics of the mobile device; and
    assign a level of privilege to the mobile device to receive a particular quality of ranging measurements based, at least in part, on the one or more parameters in the one or more messages received from the mobile device.

31. A method for obtaining a ranging service, the method comprising:
    transmitting, at a mobile device, one or more messages to obtain measurements in support of the ranging service, the one or more messages comprising one or more parameters corresponding to one or more characteristics of the mobile device; and
    receiving a message indicating an assigned level of privilege to the mobile device to receive a particular quality of ranging measurements based, at least in part, on the one or more parameters corresponding to the one or more characteristics of the mobile device.

32. The method of claim 31, and further comprising receiving a quality of the ranging service based, at least in part, on the determined level of the privilege, the quality of the ranging service being determined based, at least in part, on the one or more parameters corresponding to the one or more characteristics of the mobile device.

33. The method of claim 32, and further comprising receiving a message if the ranging service is not available to the mobile device, the availability of the ranging service being based, at least in part, on the determined quality of the ranging service.

34. The method of claim 32, and further comprising accessing a ranging service based on round trip time (RTT) measurements via an exchange of fine timing measurement (FTM)/fine timing measurement request (FTMR) messages.

35. The method of claim 32, and further comprising accessing a ranging service based on RTT measurements via an exchange of request-to-send (RTS)/clear-to-send (CTS) messages.

36. The method of claim 32, and further comprising obtaining an RTT measurement with limiting periodicity via at least one of the following: an FTM/FTMR message exchange; an RTS/CTS message exchange; or any combination thereof.

37. The method of claim 31, wherein the one or more parameters comprise at least one of the following: a Media Access Control (MAC) address of the mobile device; a model of the mobile device; an operating system of the mobile device; a ranging capability of the mobile device; a wireless service-related parameter; a parameter associating the mobile device with the quality of the ranging service; or any combination thereof.

38. An apparatus for obtaining a ranging service, the apparatus comprising:
    a wireless transceiver to communicate with an electronic communications network to:
        transmit one or more messages to obtain measurements in support of the ranging service, the one or more messages comprising one or more parameters corresponding to one or more characteristics of a mobile device; and
    one or more processors coupled to a memory, the one or more processors and the memory configured to:
        receive a message indicating an assigned level of privilege to the mobile device to receive a particular quality of ranging measurements based, at least in part, on the one or more parameters corresponding to the one or more characteristics of the mobile device.

39. The apparatus of claim 38, wherein the one or more processors are further configured to receive a quality of the ranging service based, at least in part, on the determined level of the privilege.

40. The apparatus of claim 39, wherein the one or more processors are further configured to: access a ranging service based on RTT measurements via an exchange of FTM/FTMR messages; or access a ranging service based on RTT measurements via an exchange of RTS/CTS messages.

* * * * *